Moule & Girdleston,

Earth Closet.

No. 4,133. Reissued Oct. 4. 1870.

Inventors
Moule and Girdleston
By attorney.
J. A. McDuffie

Witnesses.
C. E. Warren
E. S. McCully

N. PETERS, PHOTO-LITHOGRAPHER, WASHINGTON, D. C.

United States Patent Office.

EARTH-CLOSET COMPANY, OF HARTFORD, CONNECTICUT, ASSIGNEE OF HENRY MOULE AND HENRY JOHN GIRDLESTONE.

Letters Patent No. 91,474, dated June 15, 1869; reissue No. 4,138, dated October 4, 1870.

DIVISION B.

IMPROVEMENT IN EARTH-CLOSETS.

The Schedule referred to in these Letters Patent and making part of the same.

*To all whom it may concern:*

Be it known that HENRY MOULE and HENRY JOHN GIRDLESTONE, of England, did invent certain new and useful Improvements in Earth-Closets, of which the following is a full, clear, and exact description, reference being had to the accompanying drawing making part of this application, and the letters of reference marked thereon.

This invention relates to improvements in apparatus to be used in closets and commodes in which dry and powdered earths, (consisting of clay in a dry, unburned state, or loam,) lime, peat, and other dry vegetable matters, in powder, but more especially dry earths, are employed for deodorizing the fresh excrementitious matters, by covering or dusting them over with such powdered or dry earths, and particularly to that kind of apparatus in which the mechanism is worked by the seat of the closet.

This invention has for its object a simple, economic, and efficient mechanism for this kind of earth-closet, and consists in the employment, in combination with a closet or commode having a movable seat, and provided with a device for discharging the earth or other deodorizing material onto the excrement, of a mechanism for imparting the necessary motions to the deodorizing apparatus from the motions of the seat, as will be hereinafter more fully explained.

To enable those skilled to make and use the invention, it will now be more fully described by reference to the accompanying drawing, in which—

Figure 1:
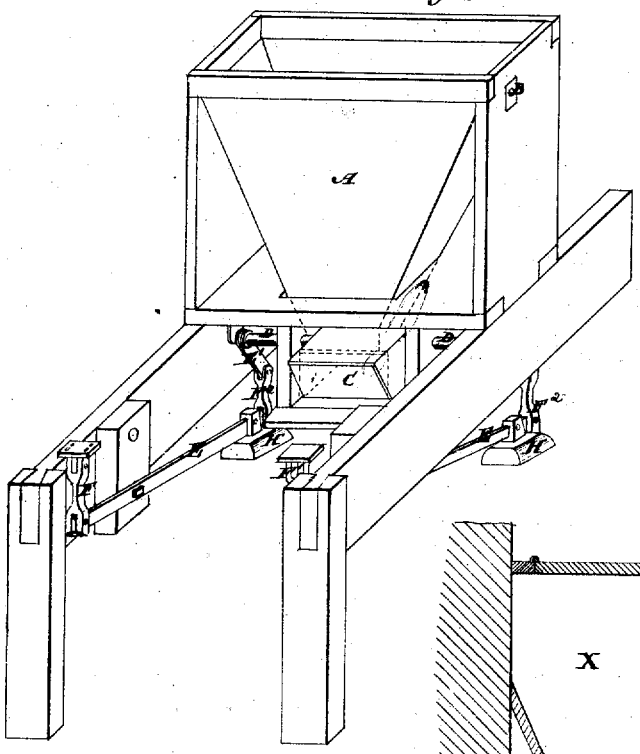

Figure 1 is a perspective view, and

Figure 2:
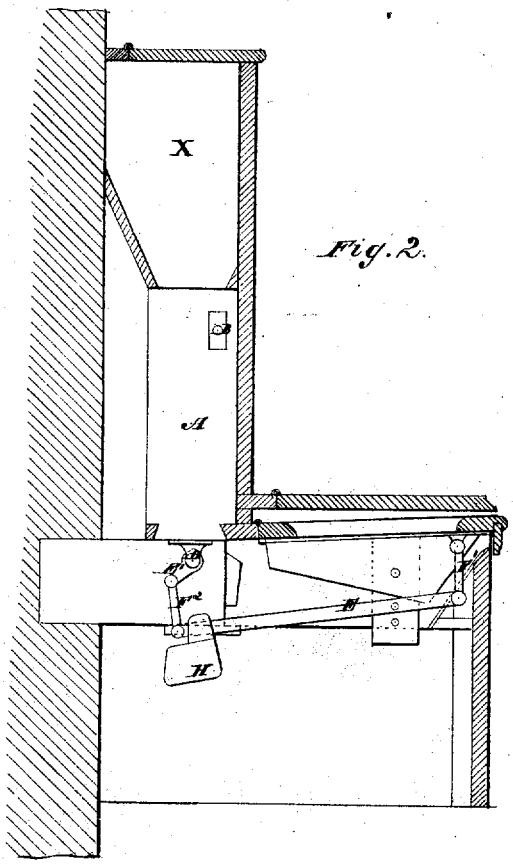

Figure 2, a sectional elevation of an earth-closet embodying the invention.

In the several figures—

A represents the hopper which contains the earth or other deodorizing material.

It is hung on pivots, at B, so as to be capable of vibration at its lower end, and may have arranged over it an auxiliary reservoir, X, as shown.

C is the distributer or "chucker," which is arranged immediately beneath the lower open end of the vibratory hopper A, on an axis, D, which is mounted to turn freely in suitable bearings, and has two arms, E E, which are coupled, by means of links $F^2$ $F^2$, to two levers, E E.

Each of these levers is pivoted, as seen, to the side of the closet-case, and pivoted to the forward end of each is a link, $F^1$; and these links $F^1$ are fastened at their upper ends to the under side of the depressible seat S, as clearly shown.

H H are weights attached to the levers E, and operating for a purpose to be presently explained.

C′ is a plate or platform arranged beneath the chucker C, and serving as a false bottom to said chucker while it is filling, and held full.

The chucker C is held in a horizontal position when the closet is not in use, and constitutes a bottom to or closes up the lower open end of hopper A, to prevent the escape of the contents of the latter.

When the closet is used, the weight of the person presses down the seat S, and thereby the forward ends of levers E are depressed, (through the medium of links F,) and their rear ends to a much greater degree elevated.

The elevation of the rear ends of levers E affects the turning of axis D, through the medium of links $F^2$ and arms E, and thereby causes the chucker to be swung down into a vertical position, as indicated by dotted lines, fig. 1, thus opening the communication between the chucker and hopper, and allowing the earth to pass down from the latter into and fill the former. In this position of the chucker the plate C′ retains the contents, and the parts maintain this condition and relation until the person rises from the seat.

As soon as the seat is relieved of weight, the weights H carry down the rear ends of levers E, (allowing the seat to rise and assume its normal position,) suddenly, and their descent, through the medium of links $F^2$ and arms E, causes the axis D to be turned, and the chucker C to be thrown up into a horizontal position again, and its contents chucked or thrown forward onto the deposit. As the chucker C discharges its contents the plate C′ serves to partially deflect and scatter it more thoroughly over the deposit.

The hopper A is pivoted, at B, a little forward of the center, so that, when its lower end is released from the bearing of the chucker in it, the hopper vibrates, by its gravity, in one direction, and when the chucker is brought back to its horizontal position, the hopper is moved back again.

Thus, at each operation of the apparatus the hopper is vibrated back and forth, which insures the jarring down of the earth every time to fill the chucker.

It will be understood that, in lieu of weights, springs may be used to force down the rear ends of levers E, and that various changes in the details of the mechanism may be made without departing from the spirit of this invention, the gist of which is in the idea of combining with the earth-distributing device a suitable mechanism for operating it, which is worked from the depressible seat.

Having fully described the invention, so that those skilled can make and use it,

What is claimed as new, and desired to be secured by Letters Patent, is—

In combination with the depressible seat and the described earth-distributing device, a mechanism for working the distributer, substantially as described, and actuated alternately by the seat and by a counteracting weight or spring.

In testimony whereof, we have hereunto set our hands and seals this 7th day of June, 1870.

EARTH-CLOSET CO., [L. S.]
J. W. BEACH, *President.*

Witnesses:
C. J. BURNELL,
J. S. TRYON, Jr.